United States Patent
Walker et al.

[15] 3,666,055
[45] May 30, 1972

[54] ENERGY ABSORBING DEVICE

[72] Inventors: Grant W. Walker; Duane B. Ford; Lester N. Meinzer, all of Sacramento, Calif.

[73] Assignee: Dynamics Research and Manufacturing, Inc.

[22] Filed: May 25, 1970

[21] Appl. No.: 40,220

[52] U.S. Cl. .................................188/1 C, 188/32, 256/13.1
[51] Int. Cl. ................................................F16f 7/12, B60t 1/14
[58] Field of Search .....................188/1 C, 32; 244/138 R; 256/13.1

[56] References Cited

UNITED STATES PATENTS 2,457,205  12/1948  Campbell et al.................188/1 C UX
3,130,819  4/1964  Marshall ................................188/1 C
3,141,655  7/1964  Platt ........................................188/32
3,252,548  5/1966  Pajak et al..............................188/1 C Primary Examiner—Duane A. Reger
Attorney—Lothrop & West

[57] ABSTRACT

An energy absorbing device includes a block adapted to be mounted on a support in position to receive an impact. The block is preferably a figure of revolution about an axis disposed approximately in the direction of impact. The block is conveniently made out of vermiculite with a cement binder and usually has a hole along the axis. A wire is wrapped coaxially around the block and has turns spaced slightly apart. An impact plate extends normally across one end of the block. The block is enclosed in a deformable wrapper.

11 Claims, 5 Drawing Figures

Patented May 30, 1972

3,666,055

INVENTORS
GRANT W. WALKER, DUANE B. FORD
& LESTER W. MEINZER
BY
Lathrop & West
ATTORNEYS

ENERGY ABSORBING DEVICE

With an increasing number of collisions of all sorts, many of them vehicular with stationary objects, and others as, for example, in dropping supplies or packages from planes to land upon the ground there is an increasing need for an energy absorbing mechanism which will be effective to cushion the impact between approaching bodies to an extent to reduce or eliminate damage. There have been various approaches to this end, some of them utilizing materials which are resilient or which are dissipated in the impact. These usually have a number of attendant disadvantages so that not many have come into widespread use and none has been particularly successful.

It is therefore an object of the invention to provide an energy absorbing device which, first of all, will be entirely effective when installed so as to absorb or convert sufficient impact energy to ensure that the approaching bodies will not be damaged.

Another object of the invention is to provide an energy absorbing device which can readily be applied in numerous different environments.

A further object of the invention is to provide an energy absorbing device which can readily be manufactured and can be installed and maintained with relatively unskilled and inexpensive labor.

A further object of the invention is to provide an energy absorbing device that is safe to use and upon impact does not itself cause secondary difficulty or damage.

A further object of the invention is to provide an energy absorber that lends itself to automatic manufacture.

Other objects together with the foregoing are attained in the embodiment of the invention described in the accompanying description and illustrated in the accompanying drawings in which.

Figure 1:
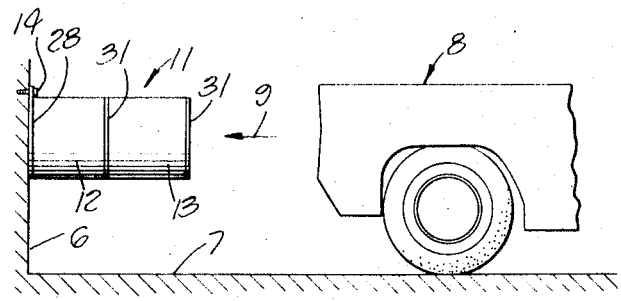
FIG. 1 is a side elevation, partly diagrammatic, of one form of energy absorbing device pursuant to the invention and shown in a typical installation.
Figure 2:
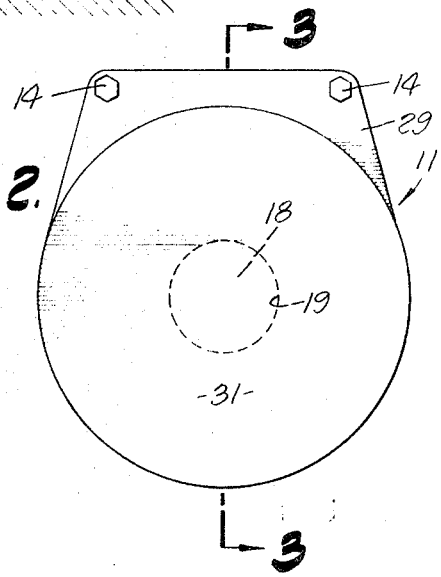
FIG. 2 is an end elevation, to an enlarged scale, of the device of FIG. 1.

While an energy absorbing device pursuant to the invention can be embodied in a widely variant number of ways and is susceptible to installation in various different environments and for numerous purposes, it has with considerable practical success been embodied in an environment particularly illustrated in FIG. 1. It is pointed out that the term "energy absorbing" is a convenient way to dramatize the conversion of energy from one form to another. The term is so used herein.

In this situation there is provided a wall 6 or other stationary abutment upstanding from a roadway 7 or the like on which a vehicle 8 advances in the direction of an arrow 9. To avoid injury to the abutment 6 and to the vehicle 8 upon impact therebetween there is provided an energy absorbing device 11 pursuant to the invention. In this instance the energy absorber includes a pair of cells 12 and 13 or blocks arranged end to end and positioned by removable fasteners 14 so that the absorbing structure is not only readily mounted in the cantilevered attitude shown but can readily be removed when desired.

Since each of the two cells 12 and 13 or blocks is substantially like the other and since either is typical the description hereinafter is confined to a single cell.

Figure 3:
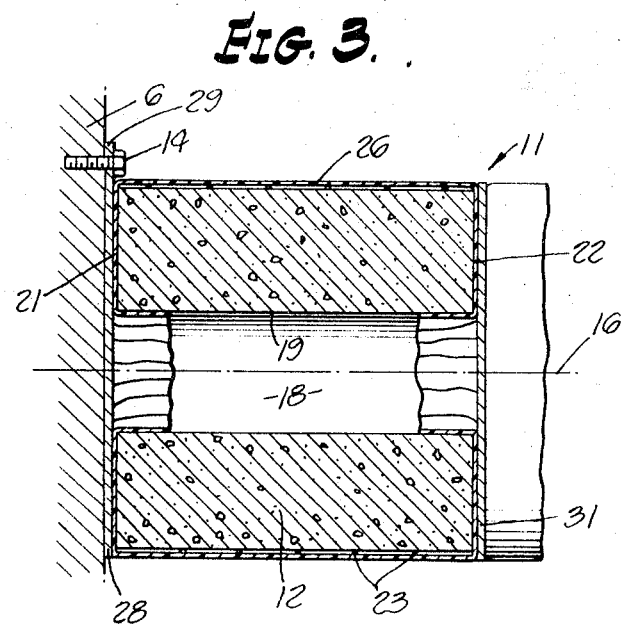
FIG. 3 is a cross section, the plane of which is indicated by the line 3—3 of FIG. 2.
Figure 4:
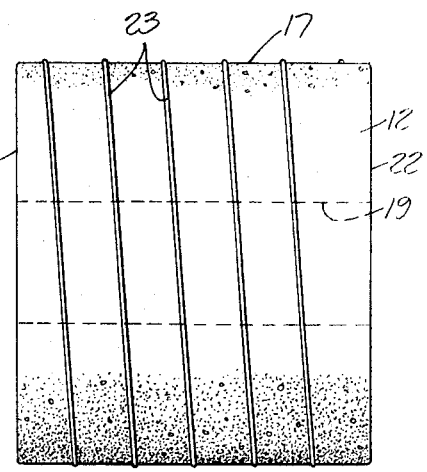
FIG. 4 is a side elevation of an energy absorbing device with the outer envelope and the end plates removed.

As particularly illustrated in FIG. 3 a typical cell 12 can have a square or rectangular cross section or other convenient shape but is preferably a figure of revolution about a usually horizontal axis 16 defined on its exterior by a right circular cylindrical surface 17. Sometimes the figure of revolution is a cone or a frustum of a cone or other recognized shape but for ready description is referred to herein as a cylinder. The interior of the cell may be but usually is not solid. Preferably it is hollow in that there is a hole 18 or aperture therethrough. The hole is defined by a right circular cylindrical surface 19 or a similar configuration concentric with the axis 16. Preferably also the end faces 21 and 22 of the cell are approximately planar and are disposed normal to the axis 16.

The materials used are varied from time to time depending upon the precise results desired but for usual uses we have found that a finely divided, granular or porous material such as vermiculite is appropriate. Sawdust likewise is a satisfactory material. To keep the finely divided granular substance in a coherent body it is intermixed with a binder which in the case of vermiculite is usually Portland cement. In the case of sawdust various adhesives such as epoxy resin have been utilized. As a convenient admix of the materials, although not a limiting one, we have utilized from 7½ to 8 parts of vermiculite, one part of cement, from one tenth to one fiftieth of the cement quantity of fireclay and roughly 8 gallons of water to each cubic foot of cement utilized. These materials are made into a wet mix and the mix is poured into a mold having an appropriate shape, as indicated. After setting to firmness the mix is removed from the mold and is dried. Sometimes artificial drying is resorted to. The resulting product is a rigid body of a predetermined, standard form.

Figure 5:
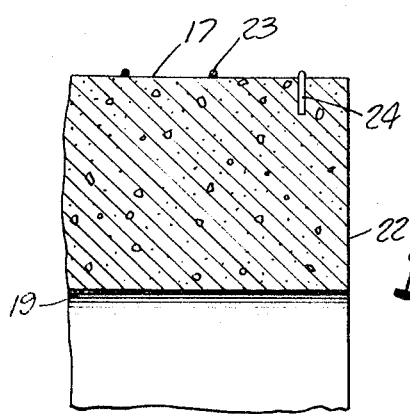
FIG. 5 is an enlarged detail in longitudinal cross section showing the interengagement of various portions of the device.

The body thus formed is not normally utilized until it has been first wrapped with an exterior screen or cage made up of a relatively long length of a filament or wire 23. At one end the wire is preferably bent inwardly to provide a hook 24 embedded in the body (FIG. 5). Then the wire is wrapped in the form of a helix concentric with the axis 16 from a point close to one end 21 of the body or cell down to a similar point adjacent the other end. At such end the wire is similarly turned in and is embedded in the material of the cell. In most instances the wire is approximately a sixteenth of an inch in diameter and the cell is about ten inches in diameter and about ten inches long. Ordinary iron wire is satisfactory for most purposes, although high tensile strength steel wire is also useful. The wire is wrapped so that there is a substantial space between the successive turns thereof. That is, the wire is preferably wrapped so that the adjacent turns are not in immediate contact with each other but are sufficiently far part to allow room for discharge, between the turns, of cell material broken upon impact.

The cell as so far prepared is preferably supplemented by enclosure in an envelope 26. Conveniently, this is a readily available, waterproof sheet material such as polyethylene. The envelope is preferably corrugated or folded and then is wrapped around the wirebound cell with the ends of the sheet tucked into the central hole 18.

Finally, there is put onto at least one end of the cell an end plate 28 having the same general end shape as that of the cell. In this instance the end plate has an extension 29 through which the fasteners 14 extend. Although it is not essential, it is usually convenient to provide an end plate 31 of similar construction at the opposite end of the cell. The plates 28 and 31 can be made of particle board, plywood or a light material of that sort so long as the supporting end plate 28 has adequate strength to carry the cell. The end plates are preferably secured in position by being fastened to the material of the cell.

While a single cell as described is adequate for many purposes, we often, as shown in FIG. 1, simply mount two cells in axial alignment with each other and fasten the two end plates, such as 28 and 31, to each other in any convenient fashion.

As has been repeatedly demonstrated by severe tests observed by high-speed camera mechanisms, impact of a vehicle 8 with the energy absorbing device as shown in FIG. 1 causes the material of the cell to compress slightly and to disintegrate into a fine powder or into very small pieces. Some of these fractions migrate from the cylindrical portion into the hole 18 and fill the hole virtually solidly. Some of the fractions migrate radially outward particularly between the turns of the wire screen or helix 23. In addition, the material in deforming and migrating outwardly tensions the wire, putting it under relatively a severe strain. The wire is elongated a substantial amount, thus itself absorbing or converting some of the energy.

The nature of the body or cell is such that it has very little rebound or resiliency. As the vehicle 8 is brought to a stop, some or all of the energy absorbing device is disintegrated or destroyed but does not particularly rebound and does not cause the vehicle to carom off or bounce.

The material in disintegrating absorbs a great deal of the energy and transforms it into heat. The particles which fly out are only small particles since they must pass between the coils of the wire. Further, they are intercepted by the envelope when an envelope is utilized. In practice, after an impact the energy absorbing device in most instances looks very much like a doughnut with the center filled in. The hole 18 usually becomes quite solidly packed; the pleated envelope expands to something roughly twice its original diameter; the impact plate 31 moves back, in a severe collision virtually into contact with the impact plate 28; and the device, although still a single entity, is virtually destroyed by serving its purpose.

It is relatively simple to detach the fastenings 14 and to remove the destroyed energy absorbing device and throw it away. A duplicate can readily be reinstalled. In areas where accidents are frequent this becomes economically quite advantageous since it does not require any great skill to remove the damaged device and promptly replace it with another.

The arrangement as shown has considerable ability to absorb energy from an impact that is not exactly along the axis 16 but comes in part from one side although, in most installations, if the normal or expected direction of impact is known it is greatly preferred to align the axis 16 therewith whether the cell or cells be horizontally cantilevered as shown in FIG. 1 or whether the plate 28 happens to be on the ground with the cell in position to receive impact from overhead. In general, pursuant to our invention, we have provided and have demonstrated successfully in practice that the energy absorbing device disclosed herein has numerous advantages and is quite effective for its intended purpose.

What is claimed is:

1. An energy absorbing device comprising a cell including a block made up of finely divided porous material held together by an adhesive binder, and wrapping bands relatively strong in tension extending around and in substantial contact with the exterior of said block, said bands being spaced apart from each other.

2. An energy absorbing device as in claim 1 in which said porous material is vermiculite and said binder is Portland cement.

3. An energy absorbing device as in claim 1 in which said cell is enclosed in an expansible sheet wrapper.

4. An energy absorbing device as in claim 1 in which said block is annular in transverse cross section.

5. An energy absorbing device as in claim 1 in which said block is a right circular cylinder in exterior configuration with a right circular cylindrical hole extending axially therethrough and said wrapping bands extend helically around said block substantially from one end thereof to the other end thereof.

6. An energy absorbing device as in claim 5 in which said wrapping bands are wire turns and in which the ends of said wire turns are embedded in said block.

7. An energy absorbing device as in claim 1 in which said block is a figure of revolution about an axis, said wrapping bands form an approximate helix generated about said axis, and a plate normal to said axis abuts one end of said block.

8. An energy absorbing device as in claim 7 including a deformable envelope enclosing said block.

9. An energy absorbing device as in claim 7 in which said block has a hollow interior defined by a wall that is a figure of revolution about said axis.

10. An energy absorbing device as in claim 1 in which the spacing of said bands is sufficient to provide spaces through which fragments of said block can pass upon impact crushing of said block.

11. An energy absorbing device comprising a cell including a block of geometrical shape made up of individual particles of finely divided material temporarily held together in the block by an adhesive binder and subject to separation of said particles by impact upon said block, and a winding around and in substantial contact with said block tending to hold said block in said geometrical shape with portions of said winding being spaced apart a distance to permit passage of said particles and small portions of said block between said portions upon said separation of said particles by impact.

* * * * *